(12) United States Patent
Zewail et al.

(10) Patent No.: US 11,581,983 B2
(45) Date of Patent: Feb. 14, 2023

(54) CONFIGURING HYBRID AUTOMATIC REPEAT REQUEST (HARQ) SOFT COMBINING FOR A SUBSET OF HARQ PROCESSES

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Qingjiang Tian, San Diego, CA (US); Xiaoxia Zhang, San Diego, CA (US); Tao Luo, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/240,732

(22) Filed: Apr. 26, 2021

(65) Prior Publication Data

US 2022/0345253 A1 Oct. 27, 2022

(51) Int. Cl.
| | |
|---|---|
| *H04W 72/04* | (2009.01) |
| *H04L 1/1812* | (2023.01) |
| *H04W 8/24* | (2009.01) |
| *H04W 72/0446* | (2023.01) |
| *H04W 74/08* | (2009.01) |

(52) U.S. Cl.
CPC .............. *H04L 1/1819* (2013.01); *H04W 8/24* (2013.01); *H04W 72/042* (2013.01); *H04W 72/0446* (2013.01); *H04W 74/0816* (2013.01)

(58) Field of Classification Search
CPC . H04W 84/042; H04W 74/0816; H04W 8/24; H04W 72/042; H04W 72/0446; H04W 72/044; H04L 1/1819; H04L 1/1822; H04L 1/1835
See application file for complete search history.

(56) References Cited

U.S. PATENT DOCUMENTS

| | | | |
|---|---|---|---|
| 9,729,295 B2* | 8/2017 | Zhang | H04L 1/1861 |
| 2013/0294318 A1* | 11/2013 | Amerga | H04W 72/005 |
| | | | 370/312 |
| 2017/0331670 A1* | 11/2017 | Parkvall | H04W 52/0274 |
| 2019/0356426 A1* | 11/2019 | He | H04W 72/042 |
| 2021/0051672 A1* | 2/2021 | Rastegardoost | H04W 72/0493 |

* cited by examiner

*Primary Examiner* — Wei Zhao
(74) *Attorney, Agent, or Firm* — Patterson + Sheridan, L.L.P.

(57) ABSTRACT

Certain aspects of the present disclosure provide techniques for configuring hybrid automatic repeat request (HARQ) soft combining for a subset of HARQ processes supported by a user equipment (UE). A method performed by the UE generally includes transmitting capability information indicating a capability of the UE to perform hybrid automatic repeat request (HARQ) soft combining and receiving, based on the capability information, configuration information from the BS configuring the UE to perform soft combining on only a subset of a set of HARQ processes.

30 Claims, 8 Drawing Sheets

A METHOD FOR CONFIGURING HARQ SOFT COMBINING BY A BASE STATION (BS), COMPRISING:

510 — RECEIVING, FROM A USER EQUIPMENT (UE), CAPABILITY INFORMATION INDICATING A CAPABILITY OF THE UE TO PERFORM HYBRID AUTOMATIC REPEAT REQUEST (HARQ) SOFT COMBINING, WHEREIN THE CAPABILITY INFORMATION COMPRISES:
A FIRST INDICATION OF A FIRST MAXIMUM NUMBER OF HARQ PROCESSES SUPPORTED BY THE UE FOR COMMUNICATING WITH THE BS AT A SAME TIME; AND
A SECOND INDICATION OF A SECOND MAXIMUM NUMBER OF HARQ PROCESSES FOR WHICH THE UE CAN PERFORM HARQ SOFT COMBINING AT THE SAME TIME, WHEREIN THE SECOND MAXIMUM NUMBER IS LESS THAN THE FIRST MAXIMUM NUMBER

520 — TRANSMITTING, BASED ON THE CAPABILITY INFORMATION, CONFIGURATION INFORMATION TO THE UE CONFIGURING THE UE TO PERFORM SOFT COMBINING ON ONLY A SUBSET OF A SET OF HARQ PROCESSES, WHEREIN A NUMBER OF HARQ PROCESSES IN THE SET OF HARQ PROCESSES IS LESS THAN OR EQUAL TO THE FIRST MAXIMUM NUMBER AND A NUMBER OF HARQ PROCESSES IN THE SUBSET IS LESS THAN OR EQUAL TO THE SECOND MAXIMUM NUMBER

A METHOD FOR CONFIGURING HARQ SOFT COMBINING BY A USER EQUIPMENT (UE), COMPRISING:

610

TRANSMITTING, TO A BASE STATION (BS), CAPABILITY INFORMATION INDICATING A CAPABILITY OF THE UE TO PERFORM HYBRID AUTOMATIC REPEAT REQUEST (HARQ) SOFT COMBINING, WHEREIN THE CAPABILITY INFORMATION COMPRISES:
A FIRST INDICATION OF A FIRST MAXIMUM NUMBER OF HARQ PROCESSES SUPPORTED BY THE UE FOR COMMUNICATING WITH THE BS AT A SAME TIME; AND
A SECOND INDICATION OF A SECOND MAXIMUM NUMBER OF HARQ PROCESSES FOR WHICH THE UE CAN PERFORM HARQ SOFT COMBINING AT THE SAME TIME, WHEREIN THE SECOND MAXIMUM NUMBER IS LESS THAN THE FIRST MAXIMUM NUMBER

620

RECEIVING, BASED ON THE CAPABILITY INFORMATION, CONFIGURATION INFORMATION FROM THE BS CONFIGURING THE UE TO PERFORM SOFT COMBINING ON ONLY A SUBSET OF A SET OF HARQ PROCESSES, WHEREIN A NUMBER OF HARQ PROCESSES IN THE SET OF HARQ PROCESSES IS LESS THAN OR EQUAL TO THE FIRST MAXIMUM NUMBER AND A NUMBER OF HARQ PROCESSES IN THE SUBSET IS LESS THAN OR EQUAL TO THE SECOND MAXIMUM NUMBER

FIG. 6

CONFIGURING HYBRID AUTOMATIC REPEAT REQUEST (HARQ) SOFT COMBINING FOR A SUBSET OF HARQ PROCESSES

INTRODUCTION

Aspects of the present disclosure relate to wireless communications, and more particularly, to techniques for configuring hybrid automatic repeat request (HARQ) soft combining for a subset of HARQ processes supported by a user equipment (UE).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a base station (BS). The method generally includes receiving, from a user equipment (UE), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the method further includes transmitting, based on the capability information, configuration information to the UE configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a base station (BS) for wireless communication. The BS generally includes a memory comprising computer-executable instructions and one or more processors configured to execute the computer-executable instructions and cause the BS to: receive, from a user equipment (UE), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the one or more processors are further configured to cause the BS to transmit, based on the capability information, configuration information to the UE configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a base station (BS) for wireless communication. The BS may include means for receiving, from a user equipment (UE), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the BS further includes means for transmitting, based on the capability information, configuration information to the UE configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a non-transitory computer-readable medium. The non-transitory computer-readable medium may comprise computer-executable instructions that, when executed by one or more processors of a base station (BS), cause the base station (BS) to: receive, from a user equipment (UE), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the non-transitory computer-readable medium further includes computer-executable instructions that cause the one or more processors of the BS to transmit, based on the capability information, configuration information to the UE configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a computer program product embodied on a computer-readable storage medium. The computer-readable storage medium may comprise code for performing wireless communication by a base station (BS) including code for: receiving, from a user equipment (UE), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the computer-readable storage medium may further include code for transmitting, based on the capability information, configuration information to the UE configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a method for wireless communication performed by a user equipment (UE). The method generally includes transmitting, to a base station (BS), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. Additionally, in some cases, the method may further include receiving, based on the capability information, configuration information from the BS configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a user equipment (UE) for wireless communication. The UE generally includes a memory comprising computer-executable instructions and one or more processors configured to execute the computer-executable instructions and cause the UE to: transmit, to a base station (BS), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the one or more processors are further configured to cause the UE to receive, based on the capability information, configuration information from the BS configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a user equipment (UE) for wireless communication. The UE may include means for transmitting, to a base station (BS), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the UE further includes means for receiving, based on the capability information, configuration information from the BS configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a non-transitory computer-readable medium. The non-transitory computer-readable medium may comprise computer-executable instructions that, when executed by one or more processors of a user equipment (UE), cause the UE to: transmit, to a base station (BS), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the non-transitory computer-readable medium further includes computer-executable instructions that cause the one or more processors of the UE to receive, based on the capability information, configuration information from the BS configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Certain aspects can be implemented in a computer program product embodied on a computer-readable storage medium. The computer-readable storage medium may comprise code for performing wireless communication by a user equipment (UE) including code for: transmitting, to a base station (BS), capability information indicating a capability of the UE to perform hybrid automatic repeat request (HARQ) soft combining, wherein the capability information comprises: a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number. In some cases, the computer-readable storage medium may further include code for receiving, based on the capability information, configuration information from the BS configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 5 is a flow diagram illustrating example operations for wireless communication by a base station.

FIG. 6 is a flow diagram illustrating example operations for wireless communication by a user equipment.

DETAILED DESCRIPTION

Aspects of the present disclosure provide apparatuses, methods, processing systems, and computer-readable mediums for configuring HARQ soft combining for a subset of HARQ processes supported by a user equipment (UE).

For example, fifth generation (5G) new radio (NR) technology may support up to 16 HARQ processes used to process downlink transmissions received from a base station in parallel and to provide feedback information indicating whether these downlink transmissions were properly received and decoded. In some cases, when a downlink transmission is not received and decoded correctly by a UE, the UE may store this erroneous or failed transmission within a soft buffer and may request retransmission of this failed transmission. When the UE receives the retransmission, the UE may combine the retransmission with the (original) transmission to provide better decoding performance when decoding the transmission.

With 16 HARQ processes, in some cases, a physical uplink control channel (PUCCH) is inserted to carry the HARQ feedback every five slots within a channel occupancy time (COT). However, inserting PUCCH every five slots may lead to a large number of uplink-downlink switches within the COT, which increases overhead. To reduce the number of uplink-downlink switches associated with HARQ feedback transmission within the COT, the number of HARQ processes may be increased. However, increasing the number of HARQ processes may require the receiving device to maintain a large soft buffer for HARQ soft combining, which may not be possible for certain UEs which may have limited memory capacity, such as due to cost constraints.

Thus, aspects of the present disclosure provide techniques for implementing a HARQ mechanism that supports a relatively large number of HARQ processes without the requirement to maintain a relatively large soft buffer for HARQ soft combining. For example, in some cases, such techniques may include configuring a receiving device, such as a user equipment, to perform soft combining on only a subset (e.g., less than all) of a set of HARQ processes that are supported by the UE.

Introduction to Wireless Communication Networks

Figure 1:
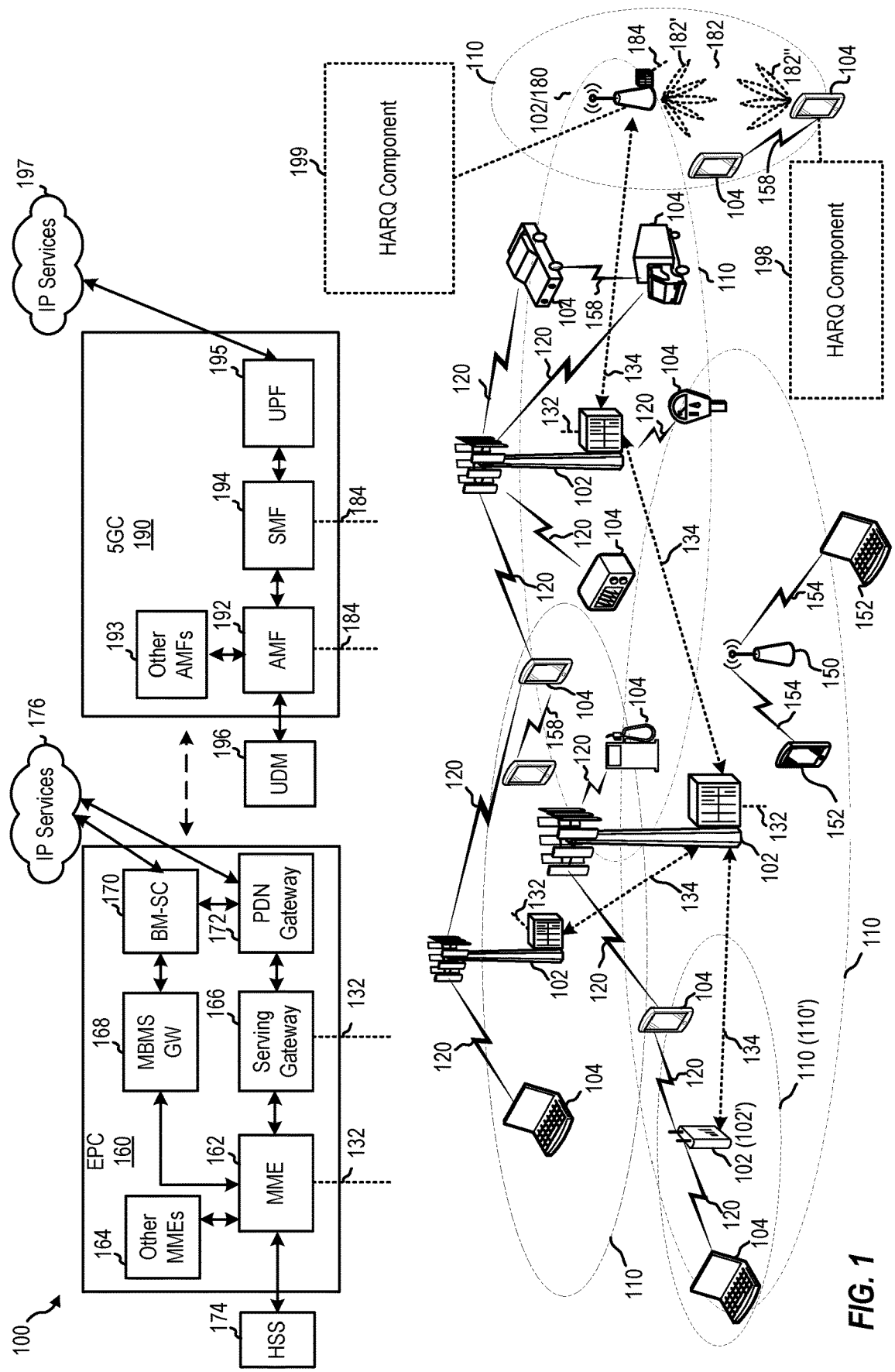
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 4:
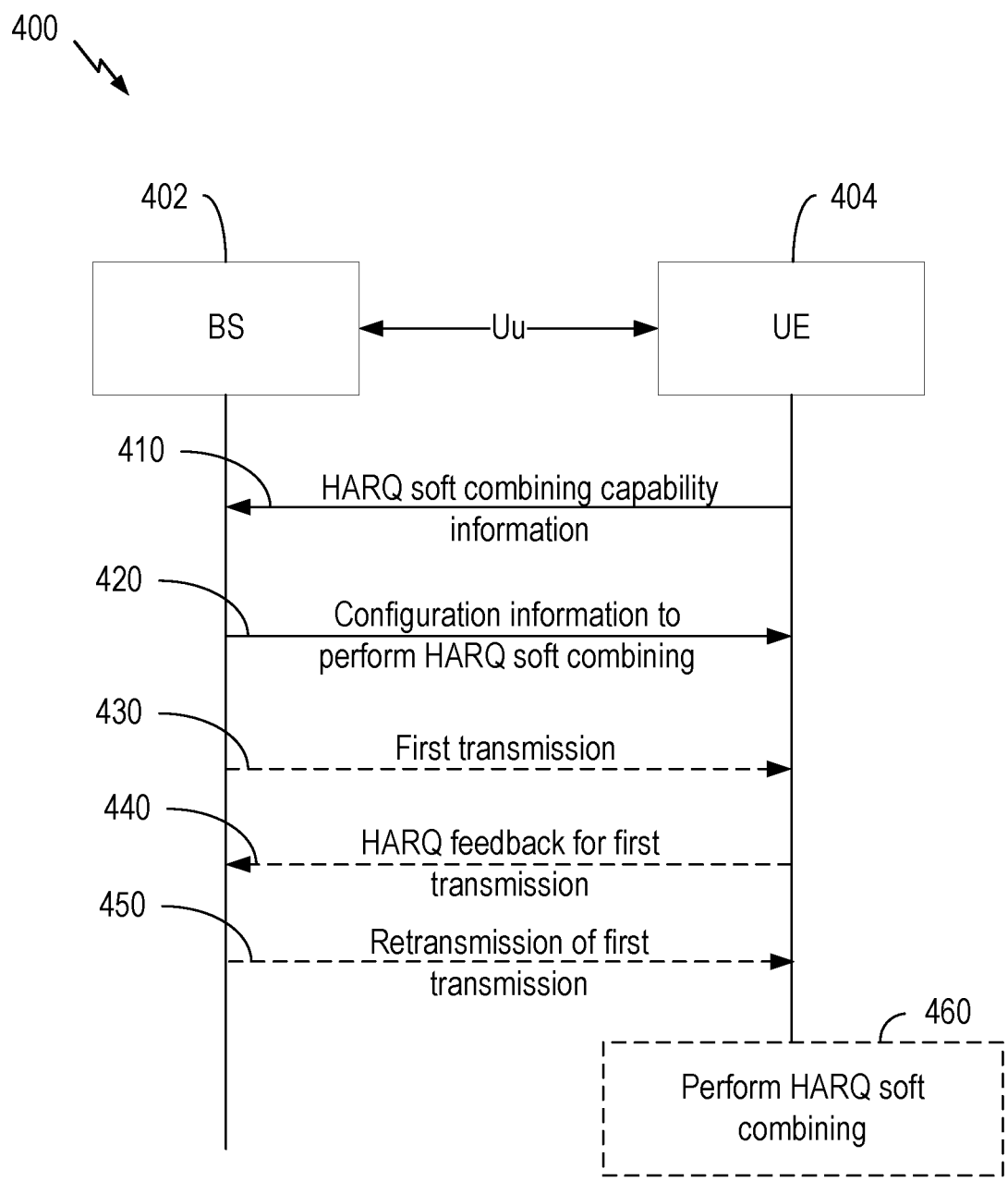
FIG. 4 is a call flow diagram illustrating example operations between a base station and a user equipment for configuring hybrid automatic repeat request (HARQ) soft combining for a subset of HARQ processes supported by the user equipment.

As shown, the BS 102 may include a hybrid automatic repeat request (HARQ) component 199, which may be configured to perform one or more of the operations illustrated in FIG. 4 or 5, as well as other operations described herein for configuring HARQ soft combining for a subset of HARQ processes supported by a UE (e.g., UE 104). Additionally, as shown, the UE 104 may include HARQ component 198, which may be used configured to perform one or more of the operations illustrated in FIG. 4 or 6, as well as other operations described herein for configuring HARQ soft combining for a subset of HARQ processes supported by a UE (e.g., UE 104).

Figure 2:
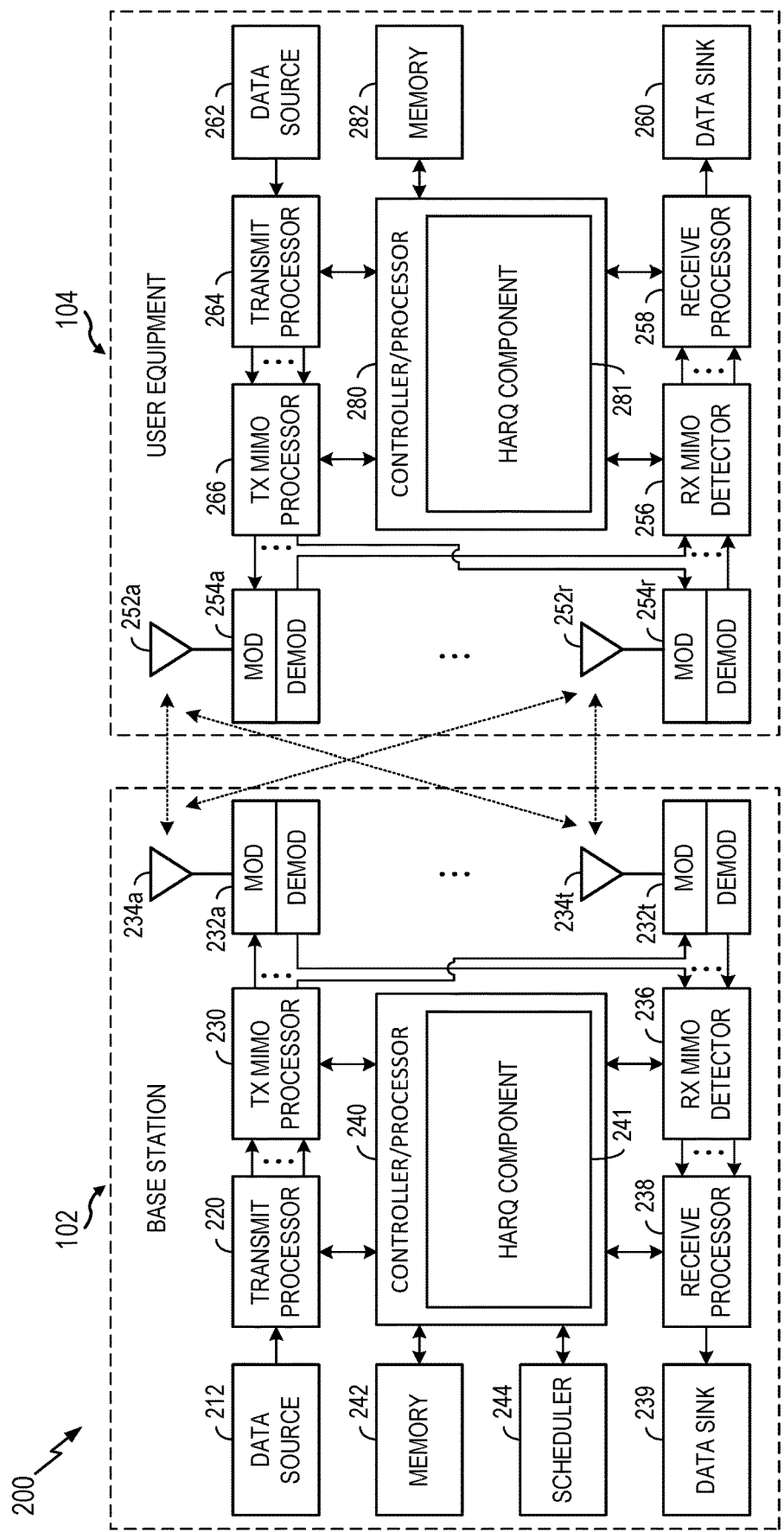
FIG. 2 is a block diagram conceptually illustrating aspects of an example base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes HARQ component 241, which may be representative of HARQ component 199 of FIG. 1. Notably, while depicted as an aspect of controller/processor 240, HARQ component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes HARQ component 281, which may be representative of HARQ component 198 of FIG. 1. Notably, while depicted as an aspect of controller/processor 280, HARQ component 281 may be implemented additionally or alternatively in various other aspects of user equipment 104 in other implementations.

Figure 3:
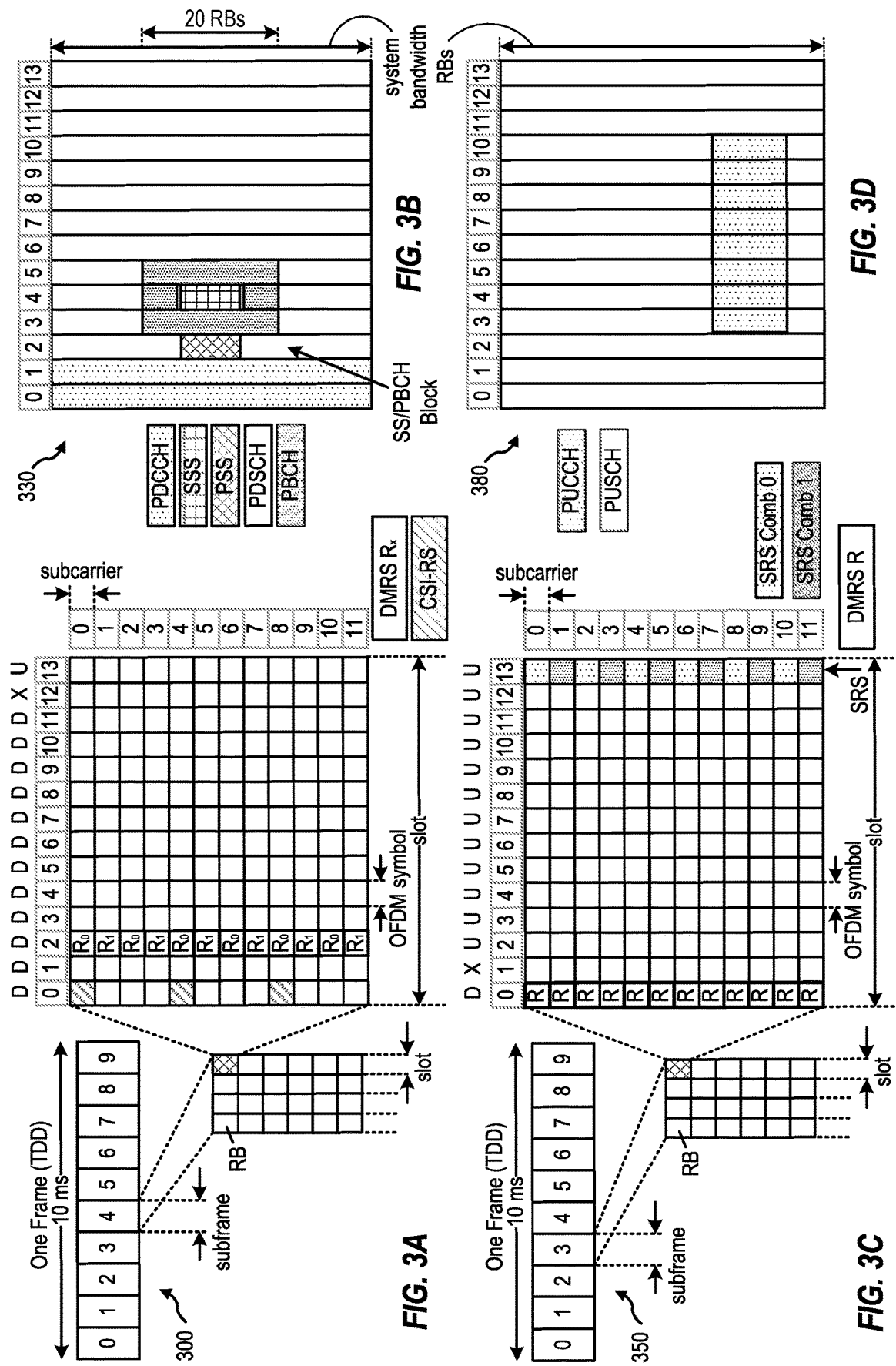
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Aspects Related to Configuring HARQ Soft Combining for a Subset of HARQ Processes Certain wireless communication networks (e.g., 5G NR), such as the wireless communication network 100 of FIG. 1, may employ a mechanism known as hybrid automatic repeat request (HARQ) to help account for erroneous transmission packets, or transmission packets that are not received and correctly decoded by a receiving device (e.g., UE 104 of FIG. 1 and/or FIG. 2). The HARQ mechanism may be implemented as a HARQ entity in a media access control (MAC) layer of the receiving device and may be employed to correct for erroneous transmission packets coming from physical (PHY) layer of the receiving device.

When receiving transmission packets from a transmitting device (e.g., BS 102 of FIG. 1 and/or FIG. 2), the HARQ entity may be configured to provide HARQ feedback information, such as a positive acknowledgement (ACK) or a negative ACK (NACK), related to these received transmission packets. If the receiving device detects that one or more of the transmission packets has not been received/decoded properly, the receiving device may buffer data associated with the erroneous transmission packets and requests for a re-transmission of the data (e.g., via transmission of a NACK) from the transmitting device (e.g., BS 102 of FIG. 1 and/or FIG. 2). When the receiving device receives the re-transmitted data, the receiving device may then combine the retransmitted data with buffered data prior to channel decoding and error detection, known as soft combining, which helps the performance of re-transmissions. In other words, with soft combining, an erroneously received packet is stored in a buffer memory and later combined with the retransmission to obtain a single, combined packet that is more reliable than its constituents.

The HARQ entity may employ multiple HARQ processes, identified by HARQ process identifiers (IDs), which may operate in parallel to provide HARQ feedback for received transmission packets (e.g., received in one or more transport blocks (TBs)) in uplink control information (UCI) transmitted on a physical uplink control channel (PUCCH). The use of multiple HARQ processes allows the transmission of these packets from the transmitting device to be continuous while the transmitting device awaits the reception of the HARQ feedback from the receiving device. For example, each individual HARQ process may only be capable of processing and providing HARQ feedback for one TB of data at a time. Accordingly, if only one HARQ process were to be used at the receiving device, the transmitting device would have to wait for HARQ feedback associated with one TB of data in order to transmit a next TB to the receiving device, which reduces performance. Thus, by employing multiple HARQ processes, the transmitting device may not need to wait for the HARQ feedback of one TB of data from the receiving device in order to proceed with transmitting another TB of data to the receiving device, for example, as each HARQ process may be capable of processing the HARQ feedback for each TB of data in parallel.

Currently, 5G NR may support up to 16 HARQ processes. With larger subcarrier spacings, such as 480 kHz to 960 kHz, there may be 160 to 320 slots within a 5 millisecond (ms) channel occupancy time (COT). A COT is an interval of time associated with a frequency band/subband that is reserved or occupied by a transmitting device (e.g., via a listen before talk (LBT) procedure), for transmission of data. Accordingly, with 16 HARQ processes, it may be necessary to insert PUCCH for HARQ feedback every five slots. Inserting PUCCH every five slots may lead to 32 to 64 uplink-downlink switches within the 5 ms COT, which increases overhead. To reduce the number of uplink-downlink switches associated with HARQ feedback transmission within the COT, the number of HARQ processes may be increased, for example, to 32 HARQ processes. However, increasing the number of HARQ processes to 32 HARQ processes may require the receiving device to maintain a large soft buffer for HARQ soft combining, which may not be possible for certain UEs.

Thus, aspects of the present disclosure provide techniques for implementing a HARQ mechanism that supports a relatively large number of HARQ processes without the requirement to maintain a relatively large soft buffer for HARQ soft combining. For example, in some cases, such techniques may include configuring a receiving device, such as a user equipment (e.g., UE 104), to perform soft combining on only a subset of a set of HARQ processes that are supported by the UE.

Example Call Flow for Configuring HARQ Soft Combining

FIG. 4 is a call flow diagram illustrating example operations 400 between a BS 402 and a UE 404 for configuring HARQ soft combining for a subset of supported HARQ processes. In some cases, the BS 402 may be an example of the BS 102 illustrated in FIG. 1. Similarly, the UE 404 may be an example of the UE 104 illustrated in FIG. 1. Further, as shown, a Uu interface may be established to facilitate communication between the BS 402 and UE 404, however, in other aspects, a different type of interface may be used.

As shown, the operations 400 shown in FIG. 4 begin with the user equipment transmitting, to the BS 402, capability information indicating a capability of the UE 404 to perform HARQ soft combining. In some cases, the capability information may include a first indication of a first maximum number of HARQ processes supported by the UE for communicating (e.g., HARQ feedback) with the BS 402 at a same time (e.g., in parallel). Additionally, in some cases, the capability information may include a second indication of a second maximum number of HARQ processes for which the UE 404 can perform HARQ soft combining at the same time. In such cases, the second maximum number may be less than the first maximum number.

In some cases, the UE 404 may determine the second maximum number of HARQ processes for which the UE 404 can perform HARQ soft combining based on, for example, a hardware capability of the UE 404. For example, in some cases, if the UE 404 includes hardware capable of implementing a larger soft buffer, then the second maximum number of HARQ processes may be larger relative to the case where the hardware capability of the UE is more limited. Further, in some cases, the UE 404 may determine the second maximum number of HARQ processes for which the UE 404 can perform HARQ soft combining based on a subcarrier spacing associated with one or more downlink transmissions corresponding to the HARQ processes. For example, as noted above, larger subcarrier spacings may require a greater number of HARQ processes and larger soft buffer to reduce overhead associated with uplink-downlink switching. Thus, for larger subcarrier spacings, the second maximum number of HARQ processes may be larger relative to the case with lower subcarrier spacings that may not require as many HARQ processes.

Thereafter, as shown at 420 in FIG. 4, the BS 402 transmits, based on the capability information received from the UE 404, configuration information to the UE 404 configuring the UE 404 to perform soft combining on only a subset of a set of HARQ processes. In some cases, a number of HARQ processes in the set of HARQ processes is less than or equal to the first maximum number supported by the UE. Additionally, in some cases, a number of HARQ processes in the subset is less than or equal to the second maximum number of HARQ processes for which the UE can perform HARQ soft combining. In some cases, the configuration information indicates a corresponding HARQ process ID for each HARQ process included within the subset. In other words, the BS 402 may specifically indicate which HARQ processes to perform the soft combining on by indicating the corresponding process ID for these HARQ processes with configured soft combining.

In some cases, the configuration information transmitted by the BS 402 may be transmitted in different manners. For example, in some cases, the configuration information may be transmitted by the BS 402 in radio resource control (RRC) signaling. For example, in some cases, the RRC signaling may include an indication of the HARQ process IDs of the HARQ processes included within the subset. In some cases, the BS 402 may configure the subset to include HARQ processes associated with downlink transmissions within a COT that may be most benefitted by the soft combining, such as HARQ processes associated with downlink transmission at the beginning (in time) of the COT. More generally, the BS 402 may configure the subset to include HARQ processes associated with one or more downlink transmissions received within a threshold time period (e.g., threshold number of symbols) of a beginning of a COT. For example, downlink transmissions at the beginning of a COT may be more prone to interference and, thus, may be received incorrectly more often. Accordingly, by configuring HARQ processes for these downlink transmissions with soft combining, a probability that these downlink transmissions may be properly received and decoded may be improved.

In some case, the configuration information may be transmitted, dynamically, by the BS 402 in downlink control information (DCI). In other words, the BS 402 may dynamically change which HARQ processes to include within the subset from time to time and may indicate these HARQ processes within DCI (e.g., which may be transmitted more frequently than RRC signaling).

In such cases, the BS 402 may indicate the configuration information in the DCI in different manners. In some cases, a redundancy version identifier (RVID) in one or more DCI transmissions may be used to indicate HARQ processes of the set of HARQ processes not to perform soft combining. For example, the BS 402 may transmit a first DCI of the one or more DCI transmissions that includes an RVID (e.g., such as RVID 0,3) and a first HARQ ID of a first HARQ process of the set of HARQ processes. In such cases, the RVID may indicate to the UE not to perform soft combining on the first HARQ process corresponding to the first HARQ ID. Accordingly, by indicating which HARQ processes to not perform the soft combining, the BS 402 (indirectly) configures the UE 404 to perform the soft combining on the subset (e.g., not including those HARQ processes for which an RVID has been received).

In some cases, the BS 402 may directly indicate which HARQ processes are included within the subset for performing the soft combining. For example, in such cases, the BS 402 may transmit a first DCI of the one or more DCI that includes a first HARQ ID of a first HARQ process of the set of HARQ processes and a bit indicating whether or not the UE should perform soft combining on the first HARQ process.

In some cases, when using this dynamic indication of HARQ processes with soft combining in DCI, the BS 402 may need to keep track of which HARQ processes have been configured with soft combining to ensure that the number of HARQ processes in the subset (e.g., configured with soft combining) does not exceed the second maximum number of HARQ processes for which the UE can perform HARQ soft combining. For example, in some cases, the BS 402 may maintain a list of HARQ processes (e.g., of the set of HARQ processes of the UE 404) that are not and/or are configured for HARQ soft combining and that have granted data allocations for the UE 404 which have not been positively acknowledged by the UE 404. Accordingly, when dynamically configuring HARQ processes with soft combining, the BS 402 may use the maintained list to ensure that the number of HARQ processes in the subset does not exceed the second maximum number. Additionally, when a HARQ process is assumed to not support soft combining, the BS 402 may reset a status of this HARQ process within the maintained list.

Returning to FIG. 4, after receiving the configuration information from the BS 402, at 430, the UE 404 optionally receives a first transmission associated with a first HARQ process of the subset. In some cases, this first transmission may not be received/decoded properly by the UE 404. In such cases, the UE 404 provides HARQ feedback (e.g., a NACK) associated with the first transmission at 440 and may store the first transmission in a soft buffer of the UE 404. The HARQ feedback may trigger the BS 402 to retransmit the first transmission. For example, as shown at 450, the UE 404 receives a retransmission of the first transmission. Thereafter, the UE performs HARQ soft combining associated with the first HARQ process to combine the first transmission with the retransmission of the first transmission to decode the first transmission.

Example Methods for Configuring HARQ Soft Combining for a Subset of HARQ Processes FIG. 5 is a flow diagram illustrating example operations 500 for wireless communication. The operations 500 may be performed, for example, by a BS (e.g., such as the BS 102 in the wireless communication network 100 of FIG. 1) for configuring HARQ soft combining for a subset of HARQ processes supported by a UE. The operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240, including the HARQ component 241) obtaining and/or outputting signals.

The operations 500 begin at 510 with receiving, from a UE, capability information indicating a capability of the UE to perform hybrid automatic repeat request (HARQ) soft combining. In some cases, the capability information comprises a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number.

In block 520, the BS transmits, based on the capability information, configuration information to the UE configuring the UE to perform soft combining on only a subset of a set of HARQ processes. In some cases, a number of HARQ processes in the set of HARQ processes is less than or equal to the first maximum number and a number of HARQ processes in the subset is less than or equal to the second maximum number.

In some cases, the configuration information indicates a corresponding HARQ process ID for each HARQ process included within the subset.

In some cases, transmitting the configuration information to the UE in block 520 includes transmitting the configuration information to the UE in radio resource control (RRC) signaling.

In some cases, the subset includes HARQ processes associated with one or more downlink transmissions received within a threshold time period of a beginning of a channel occupancy time (COT).

In some cases, transmitting the configuration information to the UE in block 520 includes transmitting the configuration information to the UE in one or more downlink control information (DCI) transmissions.

In some cases, a first DCI transmission of the one or more DCI transmissions comprises a redundancy version identifier (RVID) and a first HARQ ID of a first HARQ process of the set of HARQ processes, the RVID indicating to the UE not to perform soft combining on the first HARQ process. In some cases, a redundancy version (RV) indicated by the RVID is self-decodable.

In some cases, a first DCI transmission of the one or more DCI transmissions comprises a first HARQ ID of a first HARQ process of the set of HARQ processes and a bit indicating whether or not the UE should perform soft combining on the first HARQ process.

In some cases, the operations 500 may further include maintaining a list of HARQ processes, of the set of HARQ processes, that are not configured (and/or maintains a list of HARQ processes that are configured) for HARQ soft combining and have granted data allocations for the UE which have not been positively acknowledged by the UE. Additionally, in some cases, the operations 500 may further include ensuring that the number of HARQ processes in the subset does not exceed the second maximum number based on the maintained list.

FIG. 6 is a flow diagram illustrating example operations 600 for wireless communication, in accordance with certain aspects of the present disclosure. The operations 600 may be performed, for example, by a UE (e.g., such as the UE 104 in the wireless communication network 100 of FIG. 1) for configuring HARQ soft combining for a subset of HARQ processes supported by the UE. The operations 600 may be complementary to the operations 500 performed by the BS. The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the HARQ component 281) obtaining and/or outputting signals.

The operations 600 begin, in block 610, with transmitting, to a base station (BS), capability information indicating a capability of the UE to perform hybrid automatic repeat request (HARQ) soft combining. In some cases, the capability information includes a first indication of a first maximum number of HARQ processes supported by the UE for communicating with the BS at a same time and a second indication of a second maximum number of HARQ processes for which the UE can perform HARQ soft combining at the same time, wherein the second maximum number is less than the first maximum number.

In block 620, the UE receives, based on the capability information, configuration information from the BS configuring the UE to perform soft combining on only a subset of a set of HARQ processes. In some cases, a number of HARQ processes in the set of HARQ processes is less than or equal to the first maximum number and a number of HARQ processes in the subset is less than or equal to the second maximum number.

In some cases, the configuration information indicates a corresponding HARQ process ID for each HARQ process included within the subset.

In some cases, receiving the configuration information in block 620 may include receiving the configuration information in radio resource control (RRC) signaling.

In some cases, the subset includes HARQ processes associated with one or more downlink transmissions received within a threshold time period of a beginning of a channel occupancy time (COT).

In some cases, receiving the configuration information in block 620 may include receiving the configuration information in one or more downlink control information (DCI) transmissions.

In some cases, a first DCI transmission of the one or more DCI transmissions comprises a redundancy version identifier (RVID) and a first HARQ ID of a first HARQ process of the set of HARQ processes, the RVID indicating to the UE not to perform soft combining on the first HARQ process. In some cases, a redundancy version (RV) indicated by the RVID is self-decodable by the UE.

In some cases, a first DCI transmission of the one or more DCI transmissions comprises a first HARQ ID of a first HARQ process of the set of HARQ processes and a bit indicating whether or not the UE should perform soft combining on the first HARQ process.

In some cases, the operations 600 may further include receiving a first transmission associated with a first HARQ process of the subset. In some cases, the operations 600 may further include receiving a retransmission of the first transmission. In some cases, the operations 600 may further include performing HARQ soft combining associated with the first HARQ process to combine the first transmission with the retransmission of the first transmission to decode the first transmission.

Example Wireless Communication Devices

Figure 7:
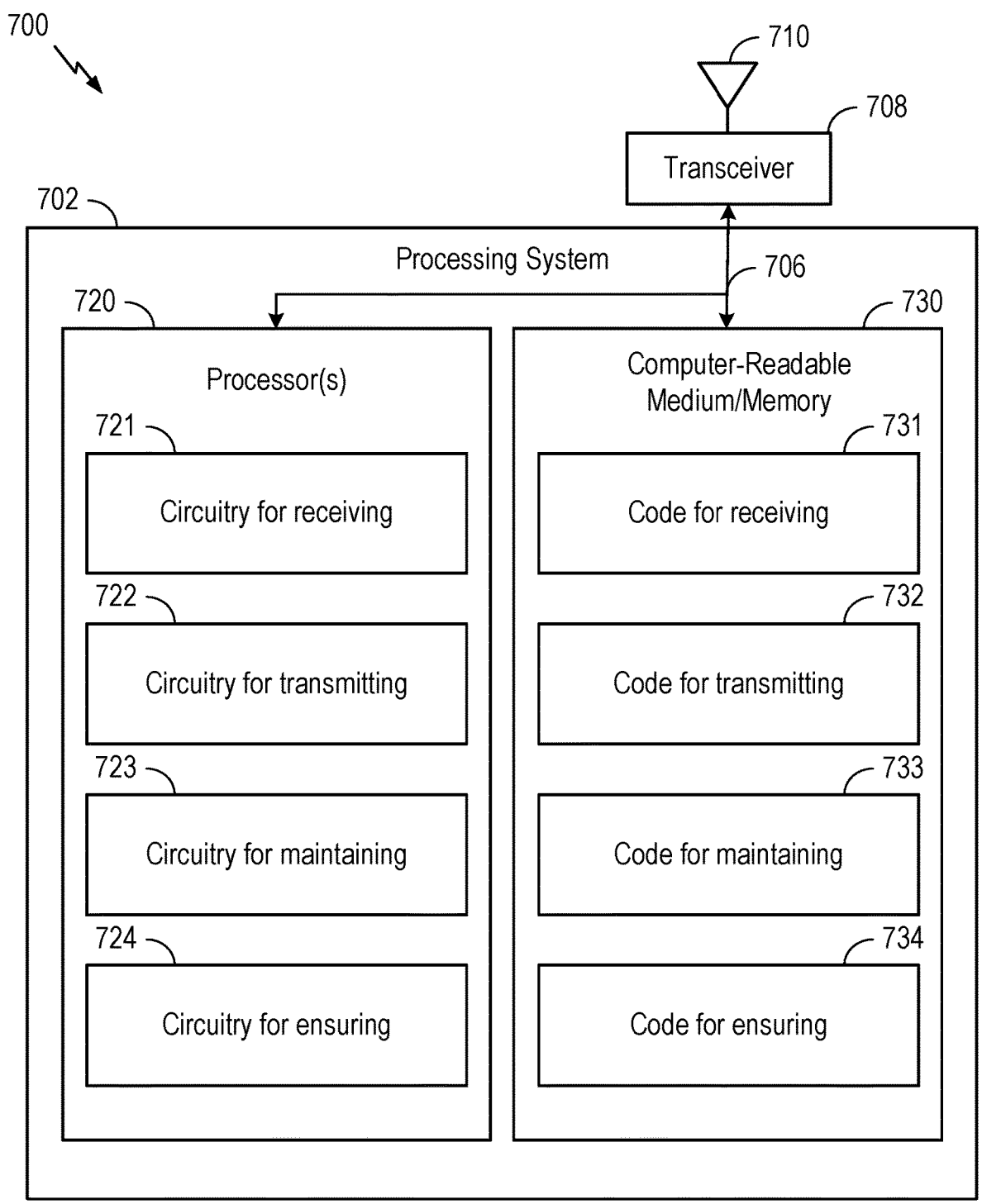
FIG. 7 depicts aspects of an example communications device.

FIG. 7 depicts an example communications device 700 that includes various components operable, configured, or adapted to perform operations for the techniques disclosed herein, such as the operations depicted and described with respect to FIGS. 4-5. In some examples, communication device 700 may be a base station 102 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 730 via a bus 706. In certain aspects, computer-readable medium/memory 730 is configured to store instructions (e.g., computer-executable code) that when executed by the one or more processors 720, cause the one or more processors 720 to perform the operations illustrated in FIGS. 4-5, or other operations for performing the various techniques discussed herein for configuring HARQ soft combining for a subset of HARQ processes supported by a UE.

In the depicted example, computer-readable medium/memory 730 stores code 731 for receiving, code 732 for transmitting, code 733 for maintaining, and code 734 for ensuring.

In the depicted example, the one or more processors 720 include circuitry configured to implement the code stored in the computer-readable medium/memory 730, including circuitry 721 for receiving, circuitry 722 for transmitting, circuitry 723 for maintaining, and circuitry 724 for ensuring.

Various components of communications device 700 may provide means for performing the methods described herein, including with respect to FIGS. 4-5.

In some examples, means for transmitting or sending (or means for outputting for transmission) may include the transceivers 232 and/or antenna(s) 234 of the base station 102 illustrated in FIG. 2 and/or transceiver 708 and antenna 710 of the communication device 700 in FIG. 7.

In some examples, means for receiving (or means for obtaining) may include the transceivers 232 and/or antenna(s) 234 of the base station illustrated in FIG. 2 and/or transceiver 708 and antenna 710 of the communication device 700 in FIG. 7.

In some examples, means for maintaining and means for ensuring may include various processing system components, such as: the one or more processors 720 in FIG. 7, or aspects of the base station 102 depicted in FIG. 2, including receive processor 238, transmit processor 220, TX MIMO processor 230, and/or controller/processor 240 (including HARQ component 241).

Notably, FIG. 7 is just use example, and many other examples and configurations of communication device 700 are possible.

Figure 8:
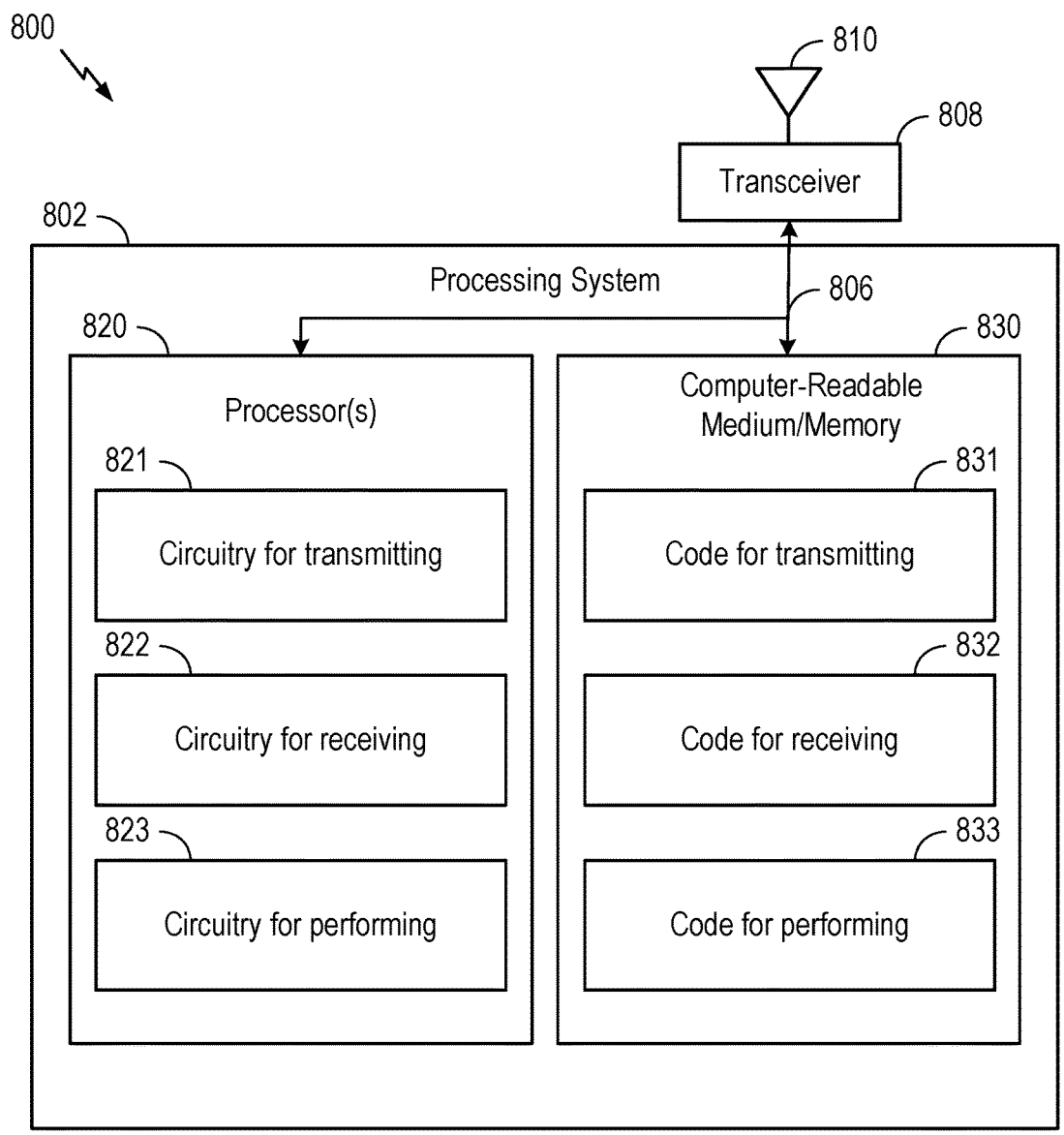
FIG. 8 depicts aspects of an example communications device.

FIG. 8 depicts an example communications device 800 that includes various components operable, configured, or adapted to perform operations for the techniques disclosed herein, such as the operations depicted and described with respect to FIG. 4 and FIG. 6. In some examples, communication device 800 may be a user equipment 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 4 and FIG. 6, or other operations for performing the various techniques discussed herein for configuring HARQ soft combining for a subset of HARQ processes supported by the UE.

In the depicted example, computer-readable medium/memory 830 stores code 831 for transmitting, code 832 for receiving, and code 833 for performing.

In the depicted example, the one or more processors 820 include circuitry configured to implement the code stored in the computer-readable medium/memory 830, including circuitry 821 for transmitting, circuitry 822 for receiving, and circuitry 823 for performing.

Various components of communications device 800 may provide means for performing the methods described herein, including with respect to FIG. 4 and FIG. 6.

In some examples, means for transmitting or sending (or means for outputting for transmission) may include the transceivers 254 and/or antenna(s) 252 of the user equipment 104 illustrated in FIG. 2 and/or transceiver 808 and antenna 810 of the communication device 800 in FIG. 8.

In some examples, means for receiving (or means for obtaining) may include the transceivers 254 and/or antenna(s) 252 of the user equipment 104 illustrated in FIG. 2 and/or transceiver 808 and antenna 810 of the communication device 800 in FIG. 8.

In some examples, means for performing may include various processing system components, such as: the one or more processors 820 in FIG. 8, or aspects of the user equipment 104 depicted in FIG. 2, including receive processor 258, transmit processor 264, TX MIMO processor 266, and/or controller/processor 280 (including HARQ component 281).

Notably, FIG. 8 is just use example, and many other examples and configurations of communication device 800 are possible.

Example Clauses

Implementation examples are described in the following numbered clauses:

Clause 1: A method for wireless communication by a user equipment (UE), comprising: transmitting, to a base station (BS), capability information indicating a capability of the UE to perform hybrid automatic repeat request (HARQ) soft combining, wherein the capability information comprises: a first indication of a first maximum number of HARQ processes supported by the UE for communicating with the BS at a same time; and a second indication of a second maximum number of HARQ processes for which the UE can perform HARQ soft combining at the same time, wherein the second maximum number is less than the first maximum number; and receiving, based on the capability information, configuration information from the BS configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Clause 2: The method of Clause 1, wherein the configuration information indicates a corresponding HARQ process ID for each HARQ process included within the sub set.

Clause 3: The method of any one of Clauses 1-2, wherein receiving the configuration information comprises receiving the in radio resource control (RRC) signaling.

Clause 4: The method of Clause 3, wherein the subset includes HARQ processes associated with one or more downlink transmissions received within a threshold time period of a beginning of a channel occupancy time (COT).

Clause 5: The method of any one of Clauses 1-4, wherein the configuration information is received in one or more downlink control information (DCI) transmissions.

Clause 6: The method of Clause 5, wherein a first DCI transmission of the one or more DCI transmissions comprises a redundancy version identifier (RVID) and a first HARQ ID of a first HARQ process of the set of HARQ processes, the RVID indicating to the UE not to perform soft combining on the first HARQ process.

Clause 7: The method of Clause 6, wherein a redundancy version (RV) indicated by the RVID is self-decodable by the UE.

Clause 8: The method of any one of Clauses 5-7, wherein a first DCI transmission of the one or more DCI transmissions comprises a first HARQ ID of a first HARQ process of the set of HARQ processes and a bit indicating whether or not the UE should perform soft combining on the first HARQ process.

Clause 9: The method of any one of Clauses 1-8, further comprising: receiving a first transmission associated with a first HARQ process of the subset; receiving a retransmission of the first transmission; and performing HARQ soft combining associated with the first HARQ process to combine the first transmission with the retransmission of the first transmission to decode the first transmission.

Clause 10: A method for wireless communication by a base station (BS), comprising: receiving, from a user equipment (UE), capability information indicating a capability of the UE to perform hybrid automatic repeat request (HARQ) soft combining, wherein the capability information comprises: a first indication of a first maximum number of HARQ processes supported by the UE for communicating with the BS at a same time; and a second indication of a second maximum number of HARQ processes for which the UE can perform HARQ soft combining at the same time, wherein the second maximum number is less than the first maximum number; and transmitting, based on the capability information, configuration information to the UE configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

Clause 11: The method of Clause 10, wherein the configuration information indicates a corresponding HARQ process ID for each HARQ process included within the sub set.

Clause 12: The method of any one of Clauses 10-11, wherein transmitting the configuration information to the UE comprises transmitting the configuration information to the UE in radio resource control (RRC) signaling.

Clause 13: The method of Clause 12, wherein the subset includes HARQ processes associated with one or more downlink transmissions received within a threshold time period of a beginning of a channel occupancy time (COT).

Clause 14: The method of any one of Clauses 10-13, wherein transmitting the configuration information to the UE comprises transmitting the configuration information to the UE in one or more downlink control information (DCI) transmissions.

Clause 15: The method of Clause 14, wherein a first DCI transmission of the one or more DCI transmissions comprises a redundancy version identifier (RVID) and a first HARQ ID of a first HARQ process of the set of HARQ processes, the RVID indicating to the UE not to perform soft combining on the first HARQ process.

Clause 16: The method of Clause 15, wherein a redundancy version (RV) indicated by the RVID is self-decodable.

Clause 17: The method of any one of Clauses 14-16, wherein a first DCI transmission of the one or more DCI transmissions comprises a first HARQ ID of a first HARQ process of the set of HARQ processes and a bit indicating whether or not the UE should perform soft combining on the first HARQ process.

Clause 18: The method of any one of Clauses 10-17, further comprising: maintaining a list of HARQ processes, of the set of HARQ processes, that: are not configured for HARQ soft combining; and have granted data allocations for the UE which have not been positively acknowledged by the UE; and ensuring that the number of HARQ processes in the subset does not exceed the second maximum number based on the maintained list.

Clause 19: An apparatus, comprising: a memory comprising executable instructions; and one or more processors configured to execute the executable instructions and cause the apparatus to perform a method in accordance with any one of Clauses 1-18.

Clause 20: An apparatus, comprising means for performing a method in accordance with any one of Clauses 1-18.

Clause 21: A non-transitory computer-readable medium comprising executable instructions that, when executed by one or more processors of an apparatus, cause the apparatus to perform a method in accordance with any one of Clauses 1-18.

Clause 22: A computer program product embodied on a computer-readable storage medium comprising code for performing a method in accordance with any one of Clauses 1-18.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of configuring HARQ soft combining for a subset of HARQ processes supported by a UE in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
 a memory comprising executable instructions; and
 one or more processors configured to execute the executable instructions and cause the UE to:
  transmit, to a base station (BS), capability information indicating a capability of the UE to perform hybrid automatic repeat request (HARQ) soft combining, wherein the capability information comprises:
   a first indication of a first maximum number of HARQ processes supported by the UE for communicating with the BS at a same time; and
   a second indication of a second maximum number of HARQ processes for which the UE supports performing HARQ soft combining at the same time, wherein the second maximum number is less than the first maximum number; and
  receive, based on the capability information, configuration information from the BS configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

2. The UE of claim 1, wherein the configuration information indicates a corresponding HARQ process ID for each HARQ process included within the subset.

3. The UE of claim 1, wherein the one or more processors are configured to cause the UE to receive the configuration information in radio resource control (RRC) signaling.

4. The UE of claim 3, wherein the subset includes HARQ processes associated with one or more downlink transmissions received within a threshold time period of a beginning of a channel occupancy time (COT).

5. The UE of claim 1, wherein the one or more processors are configured to cause the UE to receive the configuration information in one or more downlink control information (DCI) transmissions.

6. The UE of claim 5, wherein a first DCI transmission of the one or more DCI transmissions comprises a redundancy version identifier (RVID) and a first HARQ ID of a first HARQ process of the set of HARQ processes, the RVID indicating to the UE not to perform soft combining on the first HARQ process.

7. The UE of claim 6, wherein a redundancy version (RV) indicated by the RVID is self-decodable by the UE.

8. The UE of claim 5, wherein a first DCI transmission of the one or more DCI transmissions comprises a first HARQ ID of a first HARQ process of the set of HARQ processes and a bit indicating whether or not the UE should perform soft combining on the first HARQ process.

9. The UE of claim 1, wherein the one or more processors are further configured to cause the UE to:
receive a first transmission associated with a first HARQ process of the subset;
receive a retransmission of the first transmission; and
perform HARQ soft combining associated with the first HARQ process to combine the first transmission with the retransmission of the first transmission to decode the first transmission.

10. A base station (BS) for wireless communication, comprising:
a memory comprising executable instructions; and
one or more processors configured to execute the executable instructions and cause the BS to:
receive, from a user equipment (UE), capability information indicating a capability of the UE to perform hybrid automatic repeat request (HARQ) soft combining, wherein the capability information comprises:
a first indication of a first maximum number of HARQ processes supported by the UE for communicating with the BS at a same time; and
a second indication of a second maximum number of HARQ processes for which the UE supports performing HARQ soft combining at the same time, wherein the second maximum number is less than the first maximum number; and
transmit, based on the capability information, configuration information to the UE configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

11. The BS of claim 10, wherein the configuration information indicates a corresponding HARQ process ID for each HARQ process included within the subset.

12. The BS of claim 10, wherein the one or more processors are configured to cause the BS to transmit the configuration information to the UE in radio resource control (RRC) signaling.

13. The BS of claim 12, wherein the subset includes HARQ processes associated with one or more downlink transmissions received within a threshold time period of a beginning of a channel occupancy time (COT).

14. The BS of claim 10, wherein the one or more processors are configured to cause the BS to transmit the configuration information to the UE in one or more downlink control information (DCI) transmissions.

15. The BS of claim 14, wherein a first DCI transmission of the one or more DCI transmissions comprises a redundancy version identifier (RVID) and a first HARQ ID of a first HARQ process of the set of HARQ processes, the RVID indicating to the UE not to perform soft combining on the first HARQ process.

16. The BS of claim 15, wherein a redundancy version (RV) indicated by the RVID is self-decodable.

17. The BS of claim 14, wherein a first DCI transmission of the one or more DCI transmissions comprises a first HARQ ID of a first HARQ process of the set of HARQ processes and a bit indicating whether or not the UE should perform soft combining on the first HARQ process.

18. The BS of claim 10, wherein the one or more processors are further configured to cause the BS to:
maintain a list of HARQ processes, of the set of HARQ processes, that:
are not configured for HARQ soft combining; and
have granted data allocations for the UE which have not been positively acknowledged by the UE; and
ensure that the number of HARQ processes in the subset does not exceed the second maximum number based on the maintained list.

19. A method for wireless communication by a user equipment (UE), comprising:
transmitting, to a base station (BS), capability information indicating a capability of the UE to perform hybrid automatic repeat request (HARQ) soft combining, wherein the capability information comprises:
a first indication of a first maximum number of HARQ processes supported by the UE for communicating with the BS at a same time; and
a second indication of a second maximum number of HARQ processes for which the UE supports performing HARQ soft combining at the same time, wherein the second maximum number is less than the first maximum number; and
receiving, based on the capability information, configuration information from the BS configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

20. The method of claim 19, wherein the configuration information indicates a corresponding HARQ process ID for each HARQ process included within the subset.

21. The method of claim 19, wherein:
receiving the configuration information comprises receiving the configuration information in radio resource control (RRC) signaling; and
the subset includes HARQ processes associated with one or more downlink transmissions received within a threshold time period of a beginning of a channel occupancy time (COT).

22. The method of claim 19, wherein receiving the configuration information comprises receiving the configuration information in one or more downlink control information (DCI) transmissions.

23. The method of claim 22, wherein:
a first DCI transmission of the one or more DCI transmissions comprises a redundancy version identifier (RVID) and a first HARQ ID of a first HARQ process of the set of HARQ processes, the RVID indicating to the UE not to perform soft combining on the first HARQ process; and
a redundancy version (RV) indicated by the RVID is self-decodable by the UE.

24. The method of claim 22, wherein a first DCI transmission of the one or more DCI transmissions comprises a first HARQ ID of a first HARQ process of the set of HARQ processes and a bit indicating whether or not the UE should perform soft combining on the first HARQ process.

25. A method for wireless communication by a base station (BS), comprising:
receiving, from a user equipment (UE), capability information indicating a capability of the UE to perform hybrid automatic repeat request (HARQ) soft combining, wherein the capability information comprises:

a first indication of a first maximum number of HARQ processes supported by the UE for communicating with the BS at a same time; and a second indication of a second maximum number of HARQ processes for which the UE supports performing HARQ soft combining at the same time, wherein the second maximum number is less than the first maximum number; and transmitting, based on the capability information, configuration information to the UE configuring the UE to perform soft combining on only a subset of a set of HARQ processes, wherein a number of HARQ processes in the set of HARQ processes is less than or equal to the first maximum number and a number of HARQ processes in the subset is less than or equal to the second maximum number.

26. The method of claim 25, wherein the configuration information indicates a corresponding HARQ process ID for each HARQ process included within the subset.

27. The method of claim 25, wherein:

transmitting the configuration information to the UE comprises transmitting the configuration information to the UE in radio resource control (RRC) signaling; and the subset includes HARQ processes associated with one or more downlink transmissions received within a threshold time period of a beginning of a channel occupancy time (COT).

28. The method of claim 25, wherein transmitting the configuration information to the UE comprises transmitting the configuration information to the UE in one or more downlink control information (DCI) transmissions.

29. The method of claim 28, wherein:

a first DCI transmission of the one or more DCI transmissions comprises a redundancy version identifier (RVID) and a first HARQ ID of a first HARQ process of the set of HARQ processes, the RVID indicating to the UE not to perform soft combining on the first HARQ process; and a redundancy version (RV) indicated by the RVID is self-decodable.

30. The method of claim 28, wherein a first DCI transmission of the one or more DCI transmissions comprises a first HARQ ID of a first HARQ process of the set of HARQ processes and a bit indicating whether or not the UE should perform soft combining on the first HARQ process.

* * * * *